April 16, 1968 D. F. OTHMER 3,377,814
METHOD FOR PRODUCING FRESH WATER FROM SLURRY OF
ICE IN AN AQUEOUS LIQUID
Filed May 2, 1966 2 Sheets-Sheet 2
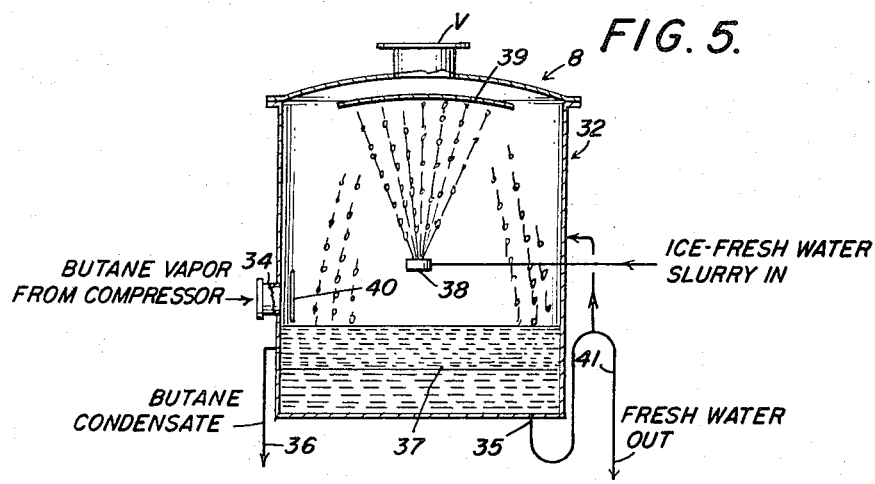
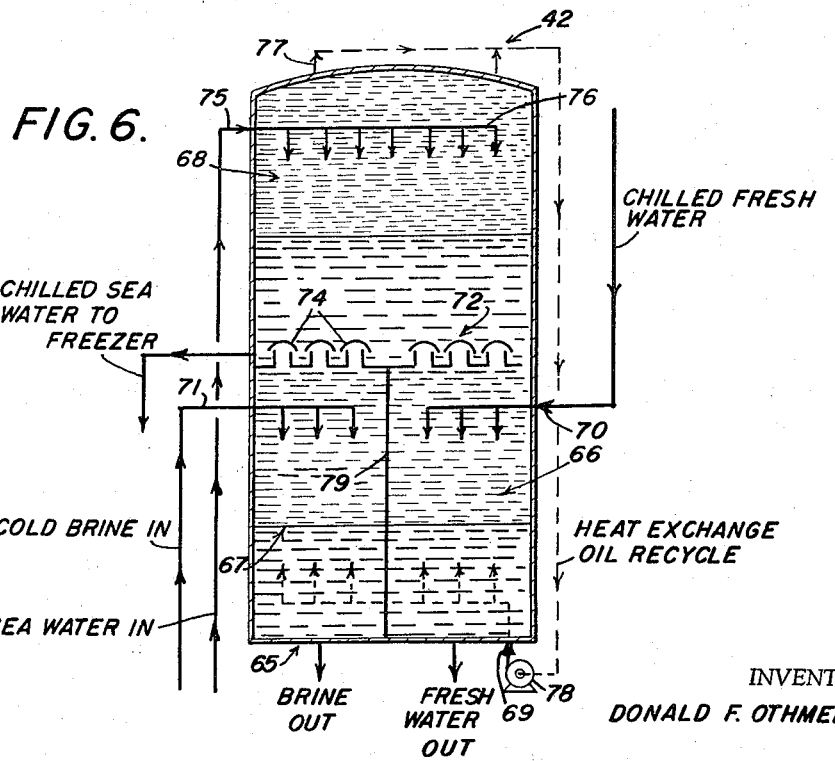
INVENTOR
DONALD F. OTHMER United States Patent Office 3,377,814
Patented Apr. 16, 1968

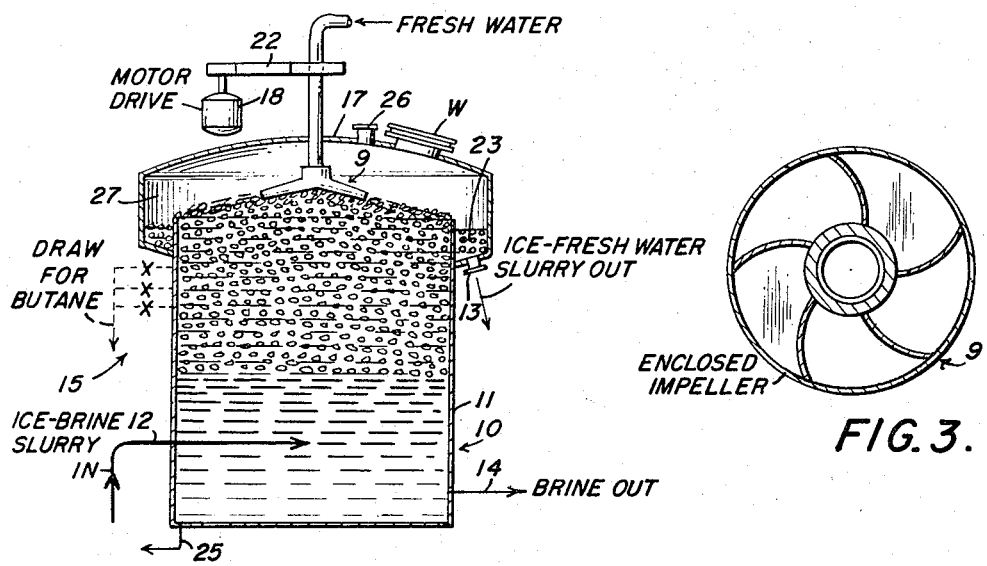
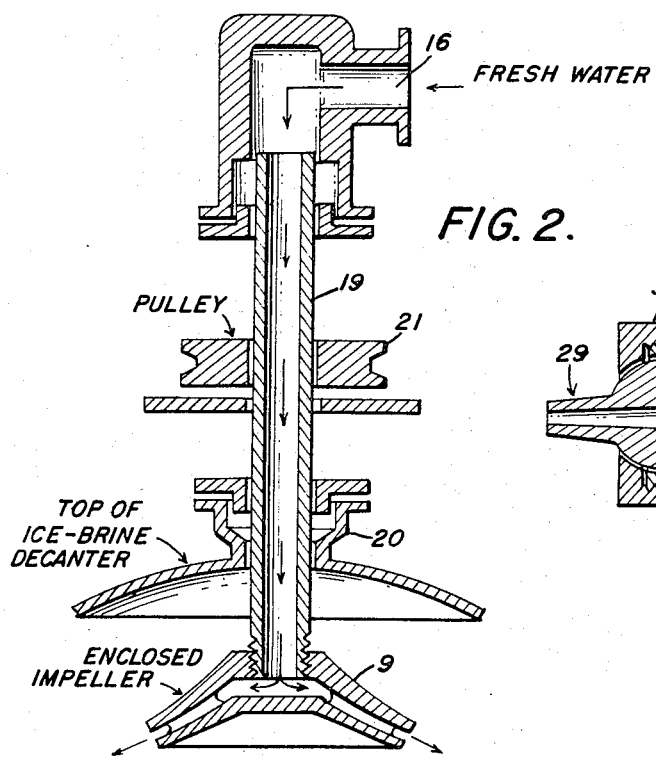
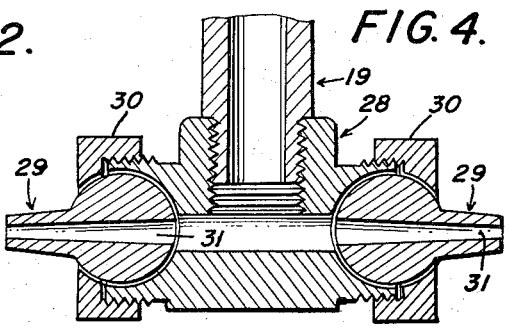

3,377,814
METHOD FOR PRODUCING FRESH WATER FROM SLURRY OF ICE IN AN AQUEOUS LIQUID
Donald F. Othmer, 140 Columbia Heights, Brooklyn, N.Y. 11201
Filed May 2, 1966, Ser. No. 556,787
9 Claims. (Cl. 62—58)

This application is a continuation-in-part of application Ser. No. 247,207, filed Dec. 26, 1962, now U. S. Patent No. 3,250,081, dated May 10, 1966.

The present invention relates to the production of fresh water from salt water, and more particularly to a method and apparatus for producing the fresh water from a slurry of small crystals or particles of ice in a brine. Such a slurry may be made in any known manner. One way is by the refrigeration of saline water, such as sea water, to form ice crystals of substantially pure water in a brine more concentrated than the original saline water due to the water separated from the liquid phase by freezing.

Accordingly, an object of the present invention is to provide for the separation of ice crystals of fresh water from the brine and the conversion of the ice crystals to fresh water in an improved manner.

Another object is to take advantage of the presence of vapors of a refrigerant to supply the heat to melt the ice crystals and, at the same time, to condense the refrigerant vapors.

Another object is to provide for heat exchange between salt water at ambient temperatures and the product—cool fresh water—so as to increase the output of fresh water for a unit of a given size.

A further object is to accomplish the foregoing in a simple, practical, and economical manner.

In accordance with the present invention, it has been found that the foregoing objects can be generally accomplished by providing a decanter for the separation by decantation of the ice crystals from the aqueous solution in which the crystals rise as a mass above the surface of the brine. A stream of fresh water moving at high velocity across the top serves to remove mechanically ice crystals, by "trimming" the rising mass of ice crystals and thereby maintaining the mass always at a predetermined height and to condition the ice crystals so that they can be handled as a fluid, by being made into a second slurry, this time with the stream of fresh water. Preferably, the decanter is so constructed and arranged that a sufficient amount of fresh water which is used to remove mechanically the ice crysals, is deflected on the fresh surface of the mass of crystals which is continually being formed, permeates the mass of ice crystals from the top downwardly, in order to wash the ice crystals and remove from the surfaces thereof any film of brine which might otherwise remain thereon.

The slurry of fresh water and small ice crystals, up to about a millimeter or two in greatest dimension, is then handled in a manner to achieve the maximum practical amount of direct surface contact of the slurry with vapors of a refrigerant under slight superatmospheric pressure within an enclosed zone. This is accomplished by an improved spray condenser, wherein a spray of a slurry of ice crystals in fresh water is supplied so that the ice crystals are melted by the supply of the vaporous heat of the refrigerant vapors, thereby to condense the refrigerant vapors and facilitate the separation thereof from the fresh water of the original stream which is augmented by that formed in the melting of the ice.

The original salt water feed coming into the system at the ambient temperature is cooled while warming the product fresh water produced by melting the ice up to as nearly as possible the temperature of the salt water without any metallic heat transfer surfaces. This may be accomplished by vaporous flashing of the salt water feed to cool the same and to heat the product fresh water. Alternately, the stream of original salt water feed may be contacted directly with a stream of chilled oil which is insoluble in the salt water. This stream of oil has previously been chilled by being contacted directly with the cold product fresh waer which is substantially at the melting point of the ice from which it was formed. Still other ways of pre-cooling the feed salt water is by use of a standard heat exchanger using tubes or sheets.

In the drawings:

FIGURE 1 is a vertical sectional view of an ice decanter in accordance with the present invention.

FIGURE 2 is an enlarged vertical sectional view of one type of spray means which may be used in the ice decanter, including a rotating impeller.

FIGURE 3 is a view of the impeller, showing it diagrammatically in cross-section, to illustrate the passage of fluid therein.

FIGURE 4 is a vertical cross-sectional view of one type of spray head which may be used instead of the impeller shown in FIGURE 3.

FIGURE 5 is a vertical sectional view of a spray condenser.

FIGURE 6 is a vertical sectional view of a liquid-liquid-liquid heat exchanger.

Referring now to FIGURES 1 to 3, in detail, an ice decanter 10 is shown which is adapted to be used in connection with the system for freezing water from solutions to produce fresh water and concentrated solutions; such a system being disclosed in the aforementioned patent. While the ice decanter is described with reference to saline water, such as sea water or concentrated brine, for the purpose of convenience and better understanding, such terminology should be given a broad interpretation which includes the use of the decanter with mixtures of small ice crystals with any aqueous solution from which ice crystals can be frozen in a substantially pure form. These ice crystals are separated then by the decanter from the resulting concentrated solution.

In the process described in the aforementioned patent, a liquid refrigerant such as butane is introduced into the solution to induce the formation of ice crystals, which refrigerant evaporates to a gaseous state and thereby cools the solution to its freezing point, and causes ice crystals to form and separate out of the more concentrated solution to give a brine-ice slurry.

*Ice decanter*

The ice decanter 10 is in the form of a vertical tank 11 having an ice-brine slurry inlet 12 in the lower zone, a fresh water-ice slurry outlet 13, a brine outlet 14, usually at a level below the inlet 12, but in any case provision is made to prevent discharge of ice crystals with the brine, by the design of the inlet and outlet and the use of baffles if desired. Outlets 15 for liquid butane or other refrigerant are spaced just below the upper end of the decanter, at different levels, so that the best level may be selected. If a liquid refrigerant is used which is heavier than water, the outlet for any small amount which enters this ice decanter is at the very bottom, as shown by the alternate position 25. A cylinder composed of very large numbers of small crystals of ice is pressed upwardly by the buoyant effect of the brine. The top of this mass is continually being cut off or trimmed as fast as it rises by means of a high velocity stream of fresh water. This may be produced by a moving stream from: (a) either one or more rotating jets, (b) a circular jet, (c) an impeller 9 having a fresh water inlet 16 and turning at a high velocity at the apex of the flat cone. Alternately there may be a high velocity stream of fixed pattern wherein a steady circular sheet of water issues at high velocity due to any suitable device. One is to have the circular sheet discharge between the peripheries of two stationary surfaces machined at small angles with the horizontal to give conical surfaces. These surfaces may be at slightly different angles; and one may be adjustable by means of a vertical screw from the outside to give a controllable flow.

The fresh water in the stream passing through the nozzle, jet, or impeller to give the high velocity circular sheet for trimming the crystals of ice from the top of the rising plunger of crystals, is at substantially the freezing point of water, so that little, if any, melting of the ice crystals takes place by contact with this water which is substantially in equilibrium with the substantially pure ice crystals. In the co-pending application Ser. No. 247,207, now U.S. Patent No. 3,250,081, this fresh water is described as a recycling stream which removes the ice crystals, to produce with them a fresh water-ice slurry to be carried to a melter-condenser which gives fresh water additional over that issuing from the jet in an amount equal to the ice crystals picked up in the slurry, since these ice crystals are melted. This additional fresh water is discharged as the product of the system; the amount which equals that first passing through the nozzle, jet, or impeller is recycled again to pick up more crystals. This water stream is thus substantially constant in its amount of recycling from the jet, picking up the crystals into a slurry, transporting them to be melted in the condenser and then recycling to carry more ice crystals to the condenser. The temperature of this aqueous stream is also constant nearly at the freezing or the melting temperature of the pure ice.

Butane and other hydrocarbons boiling in a similar temperature range are preferred refrigerants of the class having densities lighter than water. They will therefore settle or decant upwardly if carried into the decanter and thus out with the ice-water slurry in a manner to be described more completely hereinafter. Another preferred class of refrigerants which may be used are those which are heavier than water. Examples in this class are hydrocarbons which are chlorinated or fluorinated—or both. Particularly fluorinated-chlorinated hydrocarbons, which by themselves or in mixture with each other or with hydrocarbons, are advantageous because of their non-flammability, may be used. These are selected so that, either by themselves or in combination with each other or with other materials, they will have a boiling point at or near atmospheric pressure, at or slightly below the freezing point of the brine or solution which carries the ice crystals.

These refrigerant materials are almost invariably heavier than either water or the concentrated brine liquors which may remain after ice is crystallized therefrom. Hence, in these cases, the heavy liquid refrigerant will settle to the bottom of the ice decanter and will pass with the brine stream back to the freezer. A somewhat higher draw-off of brine, free of the heavier refrigerant, is made for elimination from the system; and, if desired, any such heavier refrigerant which does settle out could be separately withdrawn from an outlet connection 25 in the bottom of the decanter.

The jet stream trims or cuts off a top layer of ice crystals which discharge as an ice-fresh water slurry into a peripheral launder or trough 23, formed around the upper rim of the tank which makes up the decanter. The trough 23 is formed with the outlet 13. The angle of the jet and the velocity of its discharge is adjustable to control the "trimming" action for trimming or skimming off the top crystals as fast as the cylinder or "plunger" of ice crystals pushes up past the predetermined height. This angle of the jet with the horizontal and the velocity of its discharge depends on the radius of the ice-separator tank, and the amount of the liquid in the jet issuing therefrom, the size of the ice crystals, also the amount of fresh water which is desired to pass downwardly to wash the rising plunger of crystals. In general, the angle below the horizontal of the jet trimmer may be from about 10° to about 30°, and the jet velocity may be from about 15 feet per second to 250 feet per second. Furthermore, the height of the jet is controllable so that the height of the cylinder of ice crystals may be controllable also. The upper part of the crystal mass or cylinder actually floats above the liquid—as the top of an iceberg does.

A small amount of wash water from the jet is stopped by the crystals—as the high velocity stream trims them off to pass to the peripheral trough. This water, stopped from the jet flow, passes downwardly through the crystal mass—floating above the liquid—to wash the crystal surfaces free of brine. This wash water forms a liquid layer of pure water through which the crystals rise; but it ultimately mingles with the brine below. However, the effective flow of wash water down through the crystals may be made quite small (from 1 to 5% of the total ice formation); thus, no large amount of water is diverted from the fresh water spray used to trim ice crystals and slurry them. This amount is regulated by controlling the amounts of: (a) inlet of the brine slurry of crystals, (b) outlet of brine, (c) inlet of fresh water in the spray, as well as (d) the amount of ice crystals trimmed off the top. This latter is controlled by the angle of the spray, its elevation and linear velocity, in combination with the rising or vertical velocity of the crystal mass which, in turn, is controlled by the rate of feed and ratio of the components in the brine-ice slurry and the size of the crystals.

A domed roof 17 is provided over the conical top of the floating cylinder of ice crystals, to enclose the jet spray, the peripheral launder, and the rising mass of crystals, all of which are at about the freezing point of pure water. The atmosphere inside the space 27 of this dome is substantially butane vapor. This may be at almost normal atmospheric pressure.

The top of the decanter 17 has a vent connection 26, connected by a pipeline back to the vapor space of the freezer. This establishes the same vapor pressure as in the freezer and prevents syphoning or other undesired movement of liquids. It also allows the removal of vapors from the decanter to the suction of the vapor compressor exhausting refrigerant vapors from the freezer. This causes evaporation in the decanter of the liquid refrigerant dissolved in the brine, adsorbed on the ice crystals coming to the decanter, or otherwise coming in with the fresh water stream through the jet nozzle. This evaporation of the small amount of liquid refrigerant provides a slight refrigerating effect which is desirable to compensate partly for the normal heat inflow to the decanter through the insulation which is provided, because of the low temperature of the entire unit and its contents—approximately the freezing point of water, in relation to that of the surroundings.

As a convenience in the operation of the plant, one or more branch lines 15 are connected at points in the wall of the ice decanter at the height of the normal level of the brine. If liquid butane comes in with the ice-brine slurry, it will accumulate at this level—floating on the brine—while partially at least passing the wash water descending down through the crystal mass. This liquid butane may be withdrawn directly back to the suction of a pump (not shown) returning brine to the freezer. If a refrigerant is used with greater specific gravity than the brine, any liquid carryover to the decanter will settle to the bottom; and will be discharged therefrom the corresponding drawoff 25.

Sight windows W allow visual inspection of the trimming action of the jet. An external motor 18 with a variable speed arrangement drives a hollow shaft 19 through a stuffing box 20, to rotate the impeller. This impeller is similar in design and purpose to that used in a spray drying tower for distributing over its cross-section the usual semi-liquid feed. A mechanical arrangement of a screw device (not shown) may permit, from outside of the domed chamber, the elevation of the jet and the change of its angle to adjust the performance which is controlled, largely based on the size of the crystals, the concentration of brine, the ratio of crystal mass to brine mass, and the rate of supply of the brine-ice slurry. The same controls are necessary, in addition to a speed controller on the shaft, if there is used for the jet trimmer a rotating groove disk or impeller.

FIGURES 2 and 3 show an impeller 9 of the enclosed type to provide a jet spray for trimming the ice crystals from the top of the floating mass. This impeller is similar to that of the usual centrifugal pump, but discharges liquid at an angle slightly lower than 90° with regard to its hollow shaft 19 from which it is suspended. Through the shaft from the inlet 16 passes the cold fresh water; and this is discharged from the high speed impeller at the high velocity necessary to trim the crystals off of the top of the rising crystal mass and discharge them into the peripheral launder. A V-pulley 21 shown in vertical cross-section may be rigidly attached to the hollow shaft, or it may be attached with a spline keyway so that the shaft and impeller may be elevated or lowered with the impeller beneath, but without changing the level of the pulley. A V-belt 22 drive and the motor 18 drive the pulley, shaft 19 and impeller 9.

FIGURE 4 shows an arrangement of a spray head 28 with two or more adjustable nozzles 29. The spray head 28 is attached to the lower extremity of the hollow shaft 19 which rotates it and which supplies fresh water to the nozzles 29. The nozzles 29 may be suitably adjusted vertically by having the inner end machined as a sphere to fit matched spherical cavities in the spray head 28 and in the hold-on bushings 30. Tightening the bushings 30 while the nozzle 29 is held at the desired angle with the horizontal holds the nozzle in position to form spray at the desired angle, which is a function of the speed of rotation.

The bore 31 of the nozzle 29 may be tapered from a larger diameter cone inside to a smaller diameter outside, or it may be a cylindrical boring. In either case, interchangeable nozzles of different size bores may be available to regulate the velocity and hence dynamic inertia and cutting ability of the jet stream of water discharging for removing the top layer of crystals.

In carrying out the decanting process, the difference in density of ice crystals and the concentrated brine in which they have been grown is sufficient to cause a given mass of crystals to rise from a quiet suspension with a fraction of their mass actually floating above the brine surface. This has been used in an ice decanter to allow separation of crystals from brine. This floating is analogous to an iceberg floating with a part of its surface out of the water. The mechanical support of the submerged crystals due to their buoyancy elevates the upper ones above the liquid. There is an empty space between the individual crystals above the surface since the brine drains down. This free space gives an additional apparent buoyancy to the mass as a whole; thus, a larger apparent volume of crystals is above the brine surface than in the case of a single crystal, an iceberg, of which only about 10% may be above the surface. Brine drains downwardly from the crystals and between them by gravity from those crystals above the liquid surface.

The buoyancy of this cylinder of ice crystals pushed upwardly by the difference of density of ice and brine is increased by the fresh water wash from above which washes the brine off from the surface of the crystals to give a relatively much more dilute brine in the interstices between the crystals near the top and gradually denser brine toward the bottom of the cylinder of ice. The average of the density fo the brine in the interstices is thus less than the density of the brine below—thus there is a slight change in buoyancy experienced.

A slurry pump feed the brine-ice slurry from the freezer to the ice decanter at inlet 12; and another pipe connection allows the mother liquor to flow back from the bottom of the decanter at outlet 14 to the freezer as fast as the ice crystals settle upwardly therefrom. The ice crystals rise through the predetermined level of the brine, which is maintained and controlled by the relative rates at which crystals and brine are removed from and supplied to, the ice decanter.

The spray jet action is designed so that, by controlling the amount of fresh water supplied, the velocity and dynamic inertia of the water stream cuts off the surface of the mound of ice crystals and removes the top layer. Their mixture with the water of the jet forms an ice-fresh water slurry which is caught in a launder or trough 23.

The jet of fresh water accomplishes three purposes:

(a) It mechanically removes the ice crystals by "trimming" the rising mass at the predetermined height;

(b) It slurries these crystals into a fluidized state, which may then flow from the trough and be pumped or handled otherwise as a fluid, while at the same time mechanically mixing this slurry;

(c) It allows a certain amount of fresh water supplied to the jet to permeate down through the mass of ice crystals; and this acts as a wash liquid which may be controlled in amount so as to include from 1 to 5% of the total water produced, the maximum required when an average crystal size of about 0.5 mm.–2.0 mm. greatest dimension is being separated.

These several effects in the operation of the decanter are controlled by:

(a) The design of the jet, the size and shape of its orifices, and the rate of rotation, if any;

(b) The amount of water passing, hence the velocity of the jets through openings of controlled size;

(c) The angle of the jets with the horizontal; i.e., the angle of the cone generated;

(d) The height of the jet with reference to the overflow rim of the decanter;

(e) The effective level of the liquid in the decanter. By increasing this height, the tendency for fresh water to work down through the crystals and to the brine itself, may be regulated to an almost negligible amount; this controls the amount of wash water used on the crystals to remove the brine thereon.

The relative dimensions of the ice decanter are quite important since, in the general case, a mass of crystals floating at least 1 or 2 feet above the surface of the brine is highly desirable in order to give the best counter-current washing action of that fraction of the fresh water removed from the condenser and the liquid decanter which is allowed to be used as wash water by passing down from the stream from the trimming jet. The size of the crystals and the voidage giving this floating action and the height of the crystals above the brine level will control the apparent density of the crystals above the brine level. This voidage may, however, be partly filled with wash fresh water working downwardly, particularly just above the brine line. In some cases it has been found economic to remove from the decanter this diluted brine containing the wash water and some of the concentrated brine, in a mixture of intermediate concentration, from one of the branch lines 15. This may be passed directly back to the freezer. This is somewhat more advantageous than allowing the fresh water to diffuse into the concentrated brine and be withdrawn as part of this brine, since this is divided into two streams—one of which is product. It is desirable that product be as concentrated as possible, and that return to the freezer be as diluate as possible; hence, wash water should go directly back to freezer, and not go out in product.

To allow proper operation, the decanter should be from 10 to 30 feet in height and from 5 to 50 feet in diameter—although both larger and smaller diameters are possible.

With the crystal size and purity made in the freezer of the process described in the aforementioned patent, and in some other freezing processes, the usual centrifugal separator may be used; but centrifuges have been found uneconomic for use except in small size plants; i.e., up to a maximum of about 50,000 gallons per day.

The centrifuge usually used for separating crystals from liquids with its much higher cost and attendant power requirements, may well be replaced by the ice decanter of the present invention, for the phase separation of ice crystals from the concentrated brine coming from the freezer. The high power requirements of the centrifuge and the windage, or suction of air through the machine, are particularly disadvantageous because the energy so used (and supplied from the head in the suction through the centrifuge) is then added to the total thermal energy in the slurry, melts ice there, and thus subtracts from the cooling effect available in the condenser. This requires more energy in the refrigerator system of the freezing process. Any savings in energy in this separation of ice crystals from brine by the elimination of the centrifuge and the use of this improved decanter, are thus at least doubled in the overall energy costs of the freezing process as a whole, and usually much more than doubled, depending on the efficiency of the refrigeration system.

Spray condenser

The spray condenser in FIGURE 5 is in the form of a vertical tank 32, having an inlet 34 for the refrigerant vapor, often butane, as used here for an example. The distributor plate 40 distributes the vapors and prevents droplets of spray from entering 34. A fresh water outlet 35, and a butane condensate outlet 36, are also installed either in the lower part of the same vessel 32 or in an interconnected separate vessel which acts as a separator or decanter for the aqueous and butane phases. These separate with an interface 37.

The slurry of fresh water and small ice crystals of an average size usually less than 2 mm.—and often less than 1 mm.—in greatest dimension, is passed into the spray condenser by a spray head 38, having one or more nozzles with a relatively open passage for slurry. No passage for slurry has a cross-section diameter less than 10 to 30 times that of the diameter of the largest ice crystal to be handled.

A conical spray S, discharged by the spray head 38, impinges on a domed baffle 39, which may be 5 to 10 feet from the spray nozzle; and the liquid drops back a nearly equal distance, much of it in a curtain or film from the periphery of the baffle. The condensate butane, the refrigerant, falls with the water from the melted ice and the water originally present in the slurry. The mixture of two insoluble liquids accumulates in the lower part of the same vessel 32, or of a different vessel interconnected with piping for flow thereto of the mixed liquids. The refrigerant butane rises above the interface 37 between the two liquids of only slight miscibility, and is withdrawn as an upper layer substantially free of water, for recycle back to the freezing chamber of a related part of the processing, wherein it evaporates to give its usual refrigerant effect. The fresh water settles below the interface 37 and is discharged from the bottom substantially free of refrigerant. Suitable baffles, not shown, may be used, as is standard practice in such liquid separators, to minimize the velocity of currents in the liquids, and thus aid the removal of each entirely free of droplets of the other.

The water discharged comprises both the original fresh water carrying the ice crystals, plus that formed by melting the ice crystals.

An inverted external syphon or trap 41 has its outer leg of controllable height and vented back to the vapor space. It permits continuous withdrawal of butane liquid and the operation at an interface level controlled by the level of the overflow of the lower layer through this trap.

In a large unit, there would be many spray heads 38, so arranged as to "fill" in, so far as possible, the entire condensing volume with the apparent volume—usually conical—of the individual sprays. The spray is shown in FIGURE 5 as on an axis directed vertically upward. This has the advantage that, after hitting a baffle wherein considerable agitation of the two liquid phases results to improve heat transfer and a near equilibrium of respective temperatures, the liquids drop back through the vapors to secure an additional contact time. However, in some cases, particularly if the ice crystals (and hence the carrying droplets) are small, the sprays may be directed on an axis vertically downward. In still other cases, to fit the spray chamber into a particular volumetric configuration, the sprays may be horizontal or at any angle thereto, although usually with somewhat less efficient results. This efficiency may be measured as pounds of ice melted from crystals of a given size in a given ratio of water and in a refrigerant vapor space of unit volume at a fixed temperature and pressure.

The spray itself may be a disk or impeller with grooves as the spray "wheel" for distributing the thick liquid in a spray dryer. It rotates at a high speed; or it may be an open nozzle of stationary type designed so that it will not be plugged with the ice crystals; thus, it will have a ratio of diameters of the spray opening to that of the maximum dimension of the ice crystals of at least 10 to 30 times. A whirling spray head with one or more jet nozzles is also satisfactory, although it does not usually give the optimum "filling" with spray droplets of the volume of the cone developed, since it normally gives a hollow conical spray. Such a spray has been found to have a lower condensing capacity when used in this condenser design; and a conical spray pattern "filled" with droplets is preferable. Thus, it has been found that a spray device which is the most efficient for this service is the one which gives a relatively uniform distribution of liquid to every unit of surface in its pattern, i.e., the cross-section of the cone formed. There are numerous standard spray nozzles, spray heads, and other spraying devices available which perform well in this service, and this invention is not limited to any particular devices of this class.

The droplets discharging in the spray are desirably an average diameter no greater than about twice the greatest dimension of the ice crystals; and since they are held substantially at the freezing temperature of water until all of the ice is melted, they condense the refrigerant vapors while the crystals melt. The travel of the droplets is no less than 4 feet, preferably 5 to 10 feet. During the free "flight" of these droplets through the open space of the condenser—filled with vapors of refrigerant vapors, of which one suitable example is butane—the ice crystals melt. The mixture of water and condensed refrigerant liquid (in an exemplary case, butane) is at the melting temperature of the pure ice crystals in the fresh water slurry; i.e., 0° C. Thus, to accomplish the heat transfer from condensing vapors to melt the ice crystals in the droplets of fresh water, the refrigerant must be at a slightly higher temperature. The refrigerant is at a lower temperature in the freezer where it evaporates while chilling the brine and freezing the water therefrom at a temperature below the freezing point of pure water. The vapors formed are compressed up to the somewhat higher pressure and temperature necessary to be somewhat above the melting point of ice in the condenser, which will mean, for butane, a pressure slightly above atmospheric.

The ice-fresh water slurry may vary betwen 1% to 30% as ice-to-water ratio. A preferred ratio is usually about 5% to 10%. This ratio depends upon the type of spray in the condenser, also the type of pump used. The fresh water remains at substantially the same temperature—its freezing point, 0° C., during its use as a fluidizing medium for the solid crystals and the handling of the crystals through the sprays. Hence, the amount of water used may be more or less with little thermal effect. The desirable ratio of water to crystal weight will be determined for any given pumping and spray system, and will be that amount where the minimum pumping energy must be put into the system. More water means more pumping, but also up to some ratio, it means a lower friction of the ice crystals through the system.

The ratio of ice to fresh water in the slurry controls the water surface on which butane vapors may condense to give up its heat to the ice-water slurry. (This is an area A in the usual formula $Q=UA\Delta T$, where Q is heat transferred, U is coefficient of condensing, $\Delta T$ is temperature difference, and A is total surface of all of the drops.) Increasing the water to ice ratio increases the area for condensation. However, it also increases the volume of water surrounding each ice crystal, and hence the distance of travel of heat after being absorbed on the surface and before being utilized in melting of the ice crystals. Thus, here again, the ratio of average amount of water to ice must be optimized.

In the usual case, it has been found that a distance of travel of the drops in the spray of about 5 feet from the spray head to the baffle gives the time necessary to allow the condensation of sufficient butane in this travel time for the melting of the ice in the droplet-crystal combination. A larger travel than 10 feet is unnecessary, and wastes the space which such a long droplet travel will require.

The butane condensate and the liquid of the slurry and that formed by melting of the ice water, separates into two layers of liquid in the lower part of this same vessel used as condenser, or in a separate vessel if desired, as noted above. The mixture of the two liquids then flows thereinto, to be separated by decantation. In either case, they are separately withdrawn, the butane to be returned to the freezer, and the water to be divided into two streams—one to go to the jet trimmer of the ice decanter to pick up more ice crystals, and one to be withdrawn as product.

While satisfactory condensation is usually achieved by passing vapors through a single spray of the ice-fresh water slurry, an additional contacting may be achieved by having two or more sprays 38 and baffles 39 directly above each other. Such a series in a tower shape of shell 32 allows multiple contacting of vapors to be condensed with increased efficiency. The spray heads 38 of such a multiple arrangement would usually be supplied in parallel from a common header pipe for the ice-fresh water slurry, because this slurry is at a substantially constant temperature—the melting ponit of ice—and thus there is no reason to operate a counter-current flow of vapors and liquid as would be done if cooling water was used and was being increased in temperature while it was absorbing heat.

The vent V, the top outlet, allows the discharge of any vapors or non-condensible gases which are not condensed in passing through the spraying rain of the ice-fresh water slurry. This branch connection V may connect to another similar spray condenser, but of smaller size, as a vent condenser and with an even greater number of droplets per unit volume. In order to increase the temperature of these vapors passing through V so that they may be condensed at the temperature of the ice-fresh water slurry of such a second spray condenser, used as a vent condenser, they may be passed to an auxiliary compressor which increases their temperature and pressure above that inside of 32. As in the case of the usual vent condenser, such a one attached to the vent V may be merely a bundle of rather closely spaced tubes to maximize the vapor contact with the heat transfer surface.

*Heat exchanger*

One suitable type of heat exchanger 42 is shown in FIGURE 6 in the form of a vertical tower or tank 65, wherein there are two different streams of chilled liquid—the product fresh water, and the product brine—which are to be heat interchanged with a single stream of warmer immiscible liquid, a light naphtha gasoline, or similar hydrocarbon fraction sufficiently refined so that it will be free of sulfurous and other impurities, and thus it will impart no extraneous taste to the water. This warmer naphtha stream is, in turn, heat interchanged with the incoming feed to chill it.

In FIGURE 6, the combined heat exchanger is actually three liquid-liquid interchangers built in a single vertical tower 65, with the two lower exchanges 66 and 67, used for warming the product fresh water and the product brine, built as half cylinders. These are placed below an exchanger 68, occupying the full cylindrical cross-section for chilling the incoming sea water. The sum of the streams of the two products (brine and fresh water) is obviously equal to that of the feed sea water. Thus, the average water velocity per unit of cross-section area will be the same in both the lower two units in parallel and the upper single unit.

A convenient arrangement has now been devised for combining these units. The naphtha enters the bottom of the two half-cylinder units at 69. This lower part of the tank 65 is divided into two parts by a vertical wall 79—one 66 for the fresh water from the condenser entering at 70, and one 67 for the brine from the ice-brine decanter entering at 71. The naphtha is uniformly distributed across the entire cross-section of both 66 and 67 and allowed to enter the aqueous liquid in each as droplets. After rising against these two (completely separated) streams, the naphtha droplets are chilled, recombined at the interface into a bulk naptha liquid which passes upwardly through a division plate 72 to the upper exchanger 68. This division plate may be constructed in any one of several ways to prevent the descending droplets from the upper plate going through it downwardly.

One such construction is the familiar bubble cap and riser assembly 74 similar to that on a usual tray in a distilling column, but the riser may be somewhat longer; i.e., 4 to 10 inches, to allow a clear settling out of the raw sea water entering at 75 being chilled in this upper stage. The naphtha passes under and around this cap—which acts like an umbrella—and rises, again as droplets, through a bulk layer of the sea water, below an interface with the naphtha above, where the naphtha droplets coalesce into the bulk naptha. The descending stream of raw sea water enters through a sparger pipe 76, or similar device, as the familiar droplets, to descend through the bulk naptha. These sea water droplets also coalesce at the interface. The naphtha, now warmed again, overflows the top of the upper stage 68 at 77 and as pumped up at 69 thruogh the two stages in a recycle operation by a pump 78.

The naphtha, in its contacting of the aqueous phases, flows the same as the solvent in a counter-current liquid-liquid extractor; and the design of this liquid-liquid-liquid heat exchanger utilizes the functions and principles developed for such extractors. It functions also as a liquid-liquid axtractor in the present case by extracting the butane dissolved in both the brine and the chilled fresh water into the hydrocarbon liquid. This is a very small amount because of the high insolubility in water of hydrocarbons—even the lower ones. However, the naphtha is even less soluble; and both aqueous streams go off saturated therewith. If the naphtha is relatively pure, simple aeration of the water produced will discharge it from the fresh water and there need be no residual odor or taste. The aeration also tends to remove some of the "flatness" associated with pure water and makes it more pleasant to the taste.

On the other hand, the small amount of butane which is continuously being extracted by the heat transfer fluid, naphtha, will build up in that liquid. Periodically, a small stream of the naphtha may be withdrawn and stripped of butane in a continuous distilling unit; and then both hydrocarbons are returned to the respective parts of the system by way of the storage tanks necessary for make-up of losses.

An alternate type of heat exchanger which may be used advantageously is the one described in Method of Cooling Volatile Liquids, co-pending application No. 241,721, filed Dec. 3, 1962, now U.S. Patent No. 3,306,346 dated Feb. 28, 1967. This depends on an open flash evaporation of a volatile liquid (sea water) with an open or direct condensation on a cold liquid stream (cold fresh water leaving); and a closed condensation on tubes carrying another cold stream (cold brine stream leaving). These two operations may be accomplished in a single unit—or in two units—as described therein.

Such a heat exchanger generally is operated to cool a first liquid stream containing a volatile liquid by carrying out the following steps:

(a) Passing the said first liquid stream through a series of three or more stages, each of a successively lower pressure;

(b) Flash evaporation of a part of said volatile liquid from said first liquid stream in each of said stages with consequent cooling thereof;

(c) Passing through another part of each of the said series of stages, counter-currently to the order of the flow of said first liquid stream, a second liquid stream quite different from that of first liquid stream, which second liquid stream is at a lower temperature in each stage than is the said first liquid stream on the same stage; wherein the said second liquid stream discharges on each stage into elements of open flow with large surface areas of droplets, films, or streams exposed to the vapors formed in said flash evaporation; and said elements of open flow are then allowed to flow together to become a stream which is forced to the stage of next higher pressure, wherein the process is repeated;

(d) Condensing substantially all of the vapors formed by said flash evaporation of said volatile liquid in said first liquid stream, said vapors having a temperature no higher than that of said first liquid stream on the same stage, and said condensing of substantially all of the said vapors formed on one stage being accomplished in a single contacting on the same stage with the said second liquid stream in elements of open flow with large surface areas exposed, with consequent (e) Heating of said second liquid stream.

A quite unexpected advantage accrues in this usage of this method of cooling the volatile liquid when used in conjunction with the freezing of sea water. In cooling sea water from a usual temperature of 72° to 32° F., there is a temperature loss of 40°, or about 40 B.t.u. of sensible heat per pound of sea water cooled. Two pounds of sea water feed are usually used to make one pound of fresh water and one pound of discharged brine; thus flash evaporation gives 80 B.t.u. or about 0.08 pound of vapor for every pound of fresh water produced. This adds an equivalent amount of condensate to increase the fresh water product by 8%, and a corresponding lowered unit cost; without increase of cost of equipment or of operation. In large units making millions of gallons of water per day, this represents a substantial saving.

However, for small units, where greatest simplicity of operation is desired, there may be used a standard heat exchanger such as the ordinary shell and tube type.

While the present invention has been described in connection with the steps of separation of ice crystals and their melting, which steps are used in the production of fresh water from salt water by way of example; it will be understood that the method and apparatus disclosed and claimed herein can be utilized advantageously for extracting water from solutions of all kinds to concentrate such solutions. The original solution may contain about the same or a greater amount of total dissolved materials, as the amount in sea water. These solutions may be of other salts or inorganic or organic solids, or they may be of liquids, organic or inorganic. Of the organic liquids or solutes may be mentioned those dilute solutions of water-soluble alcohols, ketones, or acids which occur in industry. Commonly occuring aqueous solutions from which this invention may remove pure water, with accompanying concentration of the solution, are fermented beers (including distiller's beer), dilute acetone solutions—such as those recovered by scrubbing solvent-laden air with water, also vinegar (from cider or grain), fruit and vegetable juices, either unfermented or fermented as wines, etc. It is necessary that crystals of ice so formed in the refrigeration of the aqueous solution do not include crystals of the solute—whether solid or liquid in its pure form. Thus, the range of the concentration must be below that eutectic or cryohydric point, where a mixed crystal or pure crystals of the solute are formed.

I claim:

1. The method of producing fresh water from a slurry of ice crystals in an aqueous solution, which method comprises:

introducing the slurry of ice crystals in the aqueous solution into a confined zone near the bottom thereof to cause ice crystals to float upwardly to form a mass of ice crystals near the upper end of the zone and to cause the aqueous solution to descend;

moving a stream of fresh water across the upper surface of the mass of ice crystals at a velocity sufficiently high and at an angle sufficient to dislodge and to remove mechanically the top surface layer of crystals from the mass of ice crystals, thereby forming an ice-fresh water slurry;

discharging the ice-fresh water slurry from the confined zone at the upper end thereof;

discharging the aqueous solution from the confined zone at a point where it is substantially free of ice crystals;

introducing refrigerant vapors into a second confined zone;

introducing the ice-fresh water slurry into the second zone in contact with the refrigerant vapors therein, to cause thereby the vapors to condense and become liquified and to cause the ice crystals to melt and become fresh water; and separating and discharging the fresh water and the refrigerant condensate from the second confined zone.

2. The method according to claim 1, wherein the fresh water discharged from the second confined zone is at a temperature near the freezing point and is used in part to supply the stream of fresh water moving across the upper surface of the mass of ice crystals.

3. In the method according to claim 1, the additional steps of cooling the raw inlet aqueous solution used in making the slurry of ice crystals while warming the fresh water discharging from the second confined zone and warming the aqueous solution discharging from the confined zone, by:

(a) feeding the said raw inlet aqueous solution in the form of drops near to the top of the upper part of a single vertical vessel containing a rising body of naphtha of lower temperature;

(b) allowing the said drops of said raw inlet aqueous solution to settle downwardly through said rising body of naphtha of lower temperature; while cooling said raw inlet aqueous solution descending, and heating said naphtha ascending in the upper part of the said single vertical vessel;

(c) removing the said raw inlet aqueous solution, now chilled and its droplets coalesced into a body, from a point near a division plate, the lower boundary of said upper part of the said single vertical vessel, and near its mid-point;

(d) removing the said naphtha, now warmed, from a point near the top of said upper part of the said single vertical vessel;

(e) dividing the warmed naphtha into two portions and passing the respective portions in the form of drops into each of two quite separate sections of the lower part of said single vertical vessel near to its respective bottom: one section being for warming a descending body of the aqueous solution from the said confined zone wherein ice crystals are separated; and a second section being for warming a descending body of the fresh water from the second confined zone;

(f) feeding to the said section for warming the aqueous solution near its upper boundary—the said division plate—the said aqueous solution discharging from the confined zone wherein ice crystals are separated;

(g) feeding to the said section for warming fresh water near its upper boundary—the said division plate—the said fresh water discharging from the second confined zone;

(h) allowing said drops of the said warm naphtha to settle upwardly through the descending body of the said aqueous solution in its respective lower section, also to settle upwardly through the descending body of the said fresh water in its respective lower section, while cooling the said warm naphtha, and simultaneously warming both the said aqueous solution and the said fresh water;

(i) removing the warmed aqueous solution from a point near the bottom of its respective lower section;

(j) removing the warmed fresh water from a point near the bottom of its respective lower section; and (k) passing upwardly into the said upper part of said single vertical vessel through the said division plate from both the said section for the aqueous solution and the said section for the fresh water, the cooled naphtha fraction while preventing the downflow of the chilled said raw inlet aqueous solution from said upper part of the single vertical vessel into either of the two sections of said lower part of the single vertical vessel.

4. The method of decanting ice as crystals and separating it from an aqueous solution, which method comprises:

introducing an ice-aqueous solution slurry into a confined zone near the bottom theerof to cause the ice crystals to float upwardly to form a mass of ice crystals near the upper end of the zone and to cause the aqueous solution to descend;

moving a stream of fresh water to form a sheet across the upper surface of the mass of ice crystals at a velocity sufficiently high and at an angle sufficient to dislodge and to remove mechanically the top surface layer of crystals from the mass of ice crystals, thereby forming an ice-fresh water slurry;

discharging the ice-fresh water slurry from the confined zone; and discharging the aqueous solution from the confined zone at a point substantially free of suspended ice crystals.

5. The method according to claim 4, wherein the confined zone contains refrigerant vapors formed by the evaporation of a refrigerant, which evaporation produces a refrigerant effect; and said vapors are discharged from the confined zone.

6. The method according to claim 4, including the step of controlling the velocity of flow of the stream of fresh water.

7. The method according to claim 4, wherein the sheet of fresh water is conical, including the step of controlling the angle of the cone of the conical sheet of fresh water.

8. The method according to claim 4, including the step of adjusting the position of the sheet of water with respect to the mass of ice crystals.

9. The method according to claim 4, including the step of controlling the flow rate of the sheet of fresh water with respect to the rate of supply of ice crystals.

References Cited

UNITED STATES PATENTS

| | | | |
|---|---|---|---|
| 3,073,131 | 1/1963 | Ashley | 62—58 |
| 3,098,733 | 7/1963 | Rosenstein | 62—58 |
| 3,119,772 | 1/1964 | Hess | 62—58 |
| 3,240,024 | 3/1966 | Ashley | 62—58 |
| 3,251,193 | 5/1966 | Wiegandt | 62—58 |
| 3,250,081 | 5/1966 | Othmer | 62—58 |

NORMAN YUDKOFF, *Primary Examiner.*

G. HINES, *Assistant Examiner.*